(12) United States Patent
Gravison

(10) Patent No.: US 6,443,497 B1
(45) Date of Patent: Sep. 3, 2002

(54) DEVICE AND METHOD FOR TIGHTENING A SPOUT

(76) Inventor: David B. Gravison, 14 Torrey Rd., Sutton, MA (US) 01590

( * ) Notice: Subject to any disclaimer, the term of this patent is extended or adjusted under 35 U.S.C. 154(b) by 0 days.

(21) Appl. No.: 09/631,493

(22) Filed: Aug. 3, 2000

(51) Int. Cl.$^7$ ................................................. F16L 13/04
(52) U.S. Cl. ....................... 285/114; 285/192; 285/179; 285/903; 138/110; 138/114; 138/155; 411/433; 411/540
(58) Field of Search ................................. 285/192, 193, 285/179.1, 179, 903, 114; 138/110, 114, 155; 239/282, 280, 280.5; 411/433, 437

(56) References Cited

U.S. PATENT DOCUMENTS

| | | | | |
|---|---|---|---|---|
| 4,132,146 A | * | 1/1979 | Uhlig | 411/433 |
| 5,031,940 A | * | 7/1991 | Stefanos | 285/179 |
| 5,482,329 A | * | 1/1996 | McCall et al. | 285/193 |
| 6,168,361 B1 | * | 1/2001 | Adler | 411/433 |

* cited by examiner

Primary Examiner—Lynne H. Browne
Assistant Examiner—Aaron Dunwoody
(74) Attorney, Agent, or Firm—Mirick, O'Connell, DeMallie & Lougee, LLP

(57) ABSTRACT

A device for tightening a spout, attached to a previously installed angled pipe having an outside radius of curvature, in a position relative to a stop member having an opening through which at least a length of the pipe extends, comprising, at least one sleeve, comprises: at least a first leg and a second leg which meet at a juncture which defines an angle substantially corresponding to the angled pipe, wherein the first and second legs have a combined total length, wherein the first leg has a leg length and is substantially rigid along at least a portion of the leg length, has an inside radius of curvature that is approximately equal to or greater than the radius of curvature of the angled pipe, and wherein the sleeve has a slit, along the entire total length of the first and second legs, to allow the sleeve to be pressed onto and at least partially about the angled pipe; and a method for using the same.

19 Claims, 9 Drawing Sheets

DEVICE AND METHOD FOR TIGHTENING A SPOUT

FIELD OF THE INVENTION

This invention relates to a device and method for tightening a spout, that is attached to a water pipe, against a wall located between the spout and the portion of the water pipe located on the side of the wall opposite the spout.

BACKGROUND OF THE INVENTION

Loosely fitting spouts is a chronic problem associated with spouts attached to a pipe which passes through an opening in an intervening wall. This problem is particularly prevalent with a tub spout which is connected to a water pipe which passes through the wall of the tub and an intervening wall of the bathroom. Although the spout is connected to the pipe and the pipe is, at some point, connecting to another pipe, there may be some sway to the pipe and/or the lateral length of the pipe may be slightly too long between the rearward edge of the spout and the pipe connector on the opposite side of the wall. In either instance, the pipe may push the rearward spout away from the tub wall. The result is unsightly and may cause the fittings to wear prematurely.

SUMMARY OF THE INVENTION

It is therefore a primary object of this invention to provide a device for tightening a spout before or after the spout is installed.

It is a further object of this invention to provide a device adapted to tighten a tub spout before or after the spout is installed.

A preferred embodiment of the device of the invention for tightening a spout attached to a previously installed angled pipe having an outside radius of curvature, in a position relative to a stop member having an opening through which at least a length of the pipe extends, comprising, at least one sleeve, comprises: at least a first leg and a second leg which meet at a juncture which defines an angle substantially corresponding to the angled pipe, wherein the first and second legs have a combined total length, wherein the first leg has a leg length and is substantially rigid along at least a portion of the leg length, has an inside radius of curvature that is approximately equal to or greater than the radius of curvature of the angled pipe, and wherein the sleeve has a slit, along the entire total length of the first and second legs, to allow the sleeve to be pressed onto and at least partially about the angled pipe. The device may further comprise at least one slit closure member which is capable of closing at least a portion the slit in the second leg, after the sleeve is pressed about the pipe, to fix the sleeve in a position relative to the pipe; and/or at least one means for fixing the sleeve in a position relative to the stop member.

The first leg may also have one or more threads on an outside surface of at least a portion of the first leg, and wherein the means for fixing comprises, at least one nut, having an inside annular surface, comprises, a means for at least partially opening the nut to allow the nut to be positioned about the leg and for fixing the nut in a closed position after the nut is positioned about the leg, and one or more threads, on the inside annular surface, adapted to engage the leg threads.

The slit in the second leg may comprise two opposing edges having a groove in each of the edges, wherein the slit closure member may also comprise a sleeve wall insert with two opposing edges each having a profile that corresponds to one of the grooves and is adapted to engage the one of the grooves.

The means for fixing preferably comprises at least one nut which preferably comprises an inside annular surface and a means for at least partially opening the nut to allow the nut to be positioned about the leg and for fixing the nut in a closed position after the nut is positioned about the leg.

Another preferred embodiment of the device of the invention for tightening a spout attached to an angled pipe having an outside radius of curvature, in a position relative to a stop member having an opening through which at least a length of the pipe extends, comprises, at least one sleeve which comprises, at least a first leg and a second leg which meet at a juncture which defines an angle substantially corresponding to the angled pipe, wherein the first leg has a leg length and is substantially rigid along at least a portion of the leg length, has an inside radius of curvature that is approximately equal to or greater than the radius of curvature of the angled pipe.

Similarly, the device may further comprise at least one means for fixing the sleeve in a position relative to the stop member; wherein the first leg may have one or more threads on an outside surface of at least a portion of the first leg, and wherein the means for fixing preferably comprises, at least one nut, having an inside annular surface and one or more threads, on the inside annular surface, adapted to engage the leg threads.

Yet another preferred embodiment of the device of the invention may comprise an angled pipe for a tub spout, which is adapted to enable the spout to be tightened in a position relative to a wall having an opening through which at least a length of the pipe is adapted to extend, which comprises, at least a first leg and a second leg which meet at a juncture which defines an angle, wherein the first leg has a length, is substantially rigid along the leg length and has a series of threads on an outside surface of at least a portion of the first leg length; and at least one nut, having an inside annular surface, comprising, a series of threads, on the inside annular surface, adapted to engage the leg threads.

Yet another preferred embodiment of the device of the invention for tightening a spout attached to an angled pipe, having an outside radius of curvature, in a position relative to a stop member having an opening through which at least a length of the pipe extends, comprises: at least one sleeve, comprising, at least a first leg and a second leg which meet at a juncture which defines an angle substantially corresponding to the angled pipe, wherein the first and second legs have a combined total length, wherein the first leg has a leg length and is substantially rigid along at least a portion of the leg length, and has an inside radius of curvature that is approximately equal to or greater than the radius of curvature of the angled pipe; and wherein the second leg is a half-sleeve. The device may further comprise at least one means for fixing the sleeve in a position relative to the stop member. The first leg may be provided with one or more threads on an outside surface of at least a portion of the first leg, wherein the means for fixing may comprise, at least one nut, having an inside annular surface and one or more threads, on the inside annular surface, adapted to engage the leg threads.

A preferred method of the invention, for tightening spout attached to a previously installed angled pipe having an outside radius of curvature, in a position relative to a stop member having an opening through which at least a length of the pipe extends and two opposing sides, comprises the steps of, providing device comprising at least one sleeve, comprising, at least a first leg and a second leg which meet at a juncture which defines an angle substantially corresponding to the angled pipe, wherein the first and second legs have a combined total length, wherein the first leg has a leg length and is substantially rigid along at least a portion of the leg length, has an inside radius of curvature that is approximately equal to or greater than the radius of curvature of the angled pipe, and wherein the sleeve has a slit, along the entire total length of the first and second legs; placing the sleeve onto and at least partially about the angled pipe via the slit, so that the spout is positioned tightly against one side of the stop member and the sleeve is positioned tightly against the opposing side of the stop member.

The device used in the method may further comprise a means for fixing the sleeve in a position relative to the stop member, and wherein the first leg has one or more means, for engaging the fixing means at one or more positions relative to the stop member, on an outside surface of at least a portion of the first leg. In which case, the method may further comprise the step of, causing the fixing means to move in a direction so that the nut moves towards the stop member until the fixing means is positioned tightly against one side of the stop member and the spout is positioned tightly against the opposing side of the stop member.

The first leg of the device used in the method of the invention may have one or more threads on an outside surface of at least a portion of the first leg, in which case, the method may further comprise the steps of: providing at least one nut, having an inside annular surface, comprising, a means for at least partially opening the nut to allow the nut to be positioned about the leg and for fixing the nut in a closed position after the nut is positioned about the leg, and one or more threads, on the inside annular surface, adapted to engage the leg threads; fixing the nut in a closed position about the leg; and turning the nut in a direction so that the nut moves towards the stop member until the nut is positioned tightly against one side of the stop member and the spout is positioned tightly against the opposing side of the stop member.

The device used in the method may also further comprise at least one slit closure member, in which case the method may further comprise the step of, applying the slit closure member to the second leg, after the sleeve is pressed about the pipe, to fix the sleeve in a position relative to the pipe.

The slit in the second leg of the device used in the method may still further comprise two opposing edges having a groove in each of the edges, the slit closure member may further comprise a sleeve wall insert with two opposing edges each having a profile that corresponds to one of the grooves and is adapted to engage the one of the grooves; in which case, the step of applying preferably comprises inserting the sleeve wall insert into the second leg so that the edges of the sleeve wall insert engage the grooves of the second leg.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

The device and method of the invention for tightening a spout is designed to be adapted for tightening a spout which can be installed before or after the spout is fixed in place. More specifically, the device (e.g. 10) and method of the invention is particularly adapted for tightening a previously installed angled pipe (e.g. 17) and tub spout (e.g. 92), having an outside radius of curvature, in a position relative to a wall (e.g. 94) or other intervening back stop having an opening (e.g. 93) through which at least a length of the pipe extends. Preferably, though not necessarily, the spout is fixed to the end of the water pipe on one side of the wall and the device is installed and fixed to an intermediate portion of the pipe on the opposing side of the wall so that, once the device is installed, the wall is sandwiched between the forward end of the device and the rearward end of the tub spout.

Figure 1:
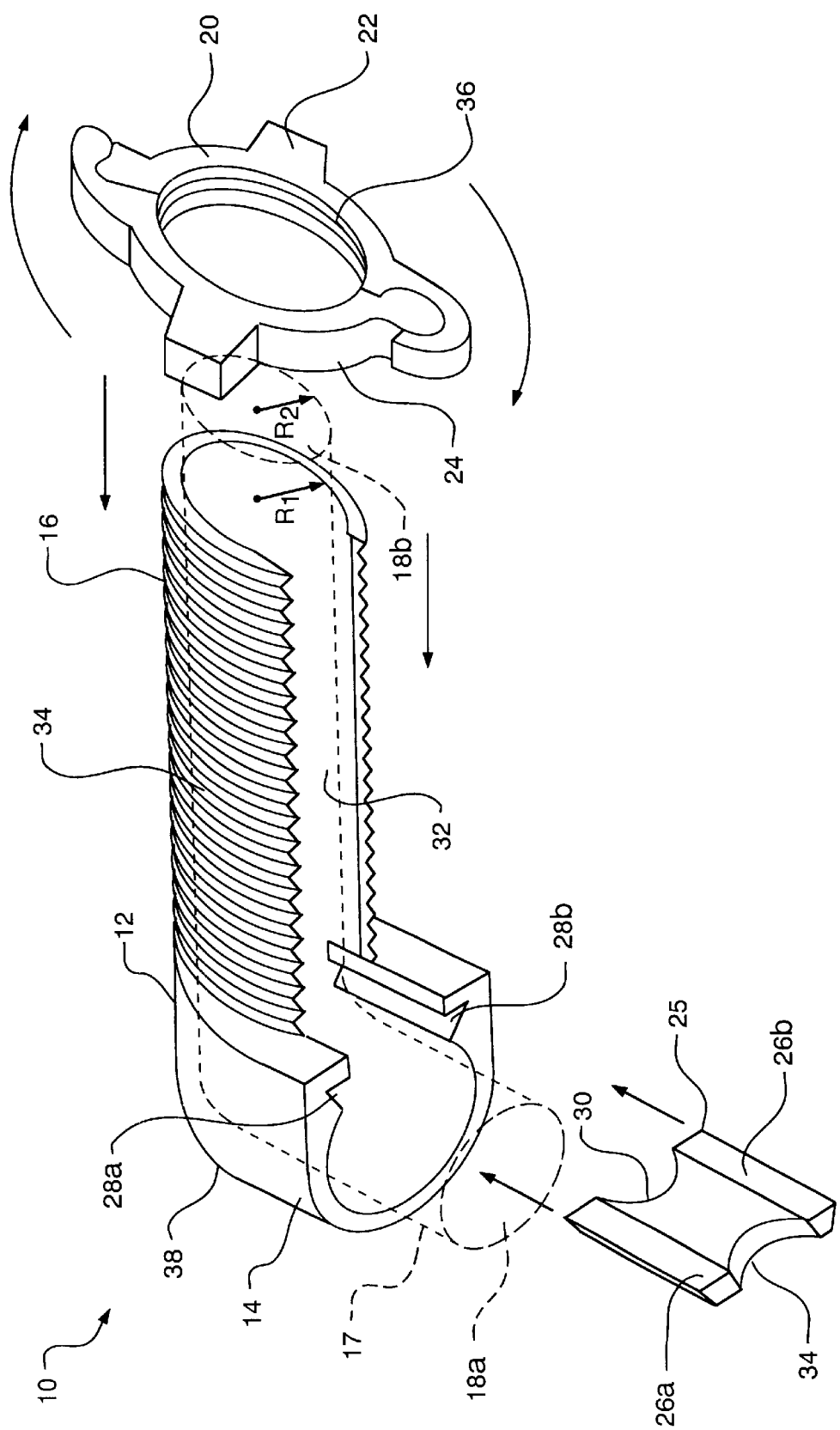
FIG. 1 is an exploded, perspective view of the preferred embodiment of the spout tightening device of the invention with the underlying spout pipe shown in phantom.

The details of the preferred embodiment of the device of the invention are shown in the drawings. Specifically, FIG. 1 shows a preferred embodiment of the device of the invention which is generally referred to as device 10. Device 10 is made up of three basic components: sleeve 12, means for fixing 20 and slit closure member 25. Sleeve 12 preferably has at least a first leg 16 and a second leg 14 which meet at juncture or elbow 38. Sleeve 12 is shaped at an angle which corresponds to the angle formed by leg 18a and 18b of underlying water pipe 17 to which sleeve 12 is fixed. The first and second legs of sleeve 12 have a combined total length, wherein the first leg has a leg length and is substantially rigid along the leg length (able to counteract any backward pressure caused by tightened nut), (as opposed to some give desired in the direction of its circumference), has an inside radius of curvature that is approximately equal to or slightly greater than the radius of curvature of the legs of water pipe 17, and has a series of threads 34 on an outside surface of at least a portion of first leg 16. Sleeve 12 must have an inside radius of curvature $R_1$ that is at least slightly larger that the outside radius of curvature $R_2$ of pipe 17.

Sleeve 12 has a slit 32, along the combined total length of the first and second legs of sleeve 12. Slit 32 has a width (together with the circumferential give of the sleeve) sufficient to allow sleeve 12 to be pressed onto and at least partially about water pipe 17.

Figure 2:
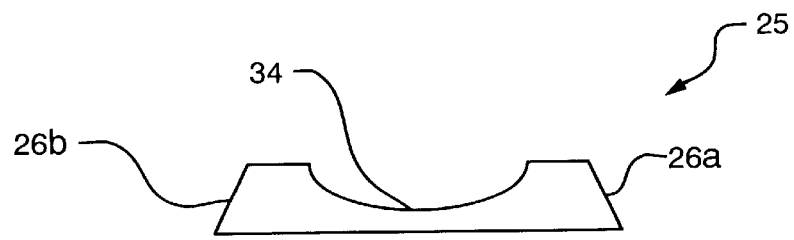
FIG. 2 is a cross-sectional view of a preferred embodiment of the slit closure member of the device shown in FIG. 1.

Device 10 is provided with at least one slit closure member 25 (FIGS. I and 2) which is capable of closing at least a portion of slit 32 in second leg 14 after sleeve 12 is pressed about pipe 17. Closure member 25 serves to fix sleeve 12 in a position relative to pipe 17. Closure member 25 is an insert which has a generally trapezoidal shape in cross-section (FIG. 2) with a depression 34 in the shorter top side which corresponds to the outside surface of pipe 17. A portion of the inside surface of second leg 14 of sleeve 12 is cut or molded to form grooves 28a and 28b on opposing edges of slit 32 having a profile which corresponds to edges 26a and 26b of closure member 25. After sleeve 12 is placed in position about pipe 17, closure member 25 is inserted into grooves 28a and 28b of sleeve 12 as shown in FIG. 1 until the forward end of closure member 25 is pressed up against pipe 17. The forward end of closure member 25 is also provided with depression 30 which also corresponds to the outside surface of pipe 17. Closure member 25 effectively fills in the opening in the second leg of sleeve 12 created by slit 32, to form a substantially solid sleeve around the portion of pipe 17 underlying closure member 25. The slit closure member of the invention is not necessarily limited to the shape and design of closure member 25 and may take any suitable shape and design capable of holding the sleeve in position relative to the underlying water pipe.

Figure 8:
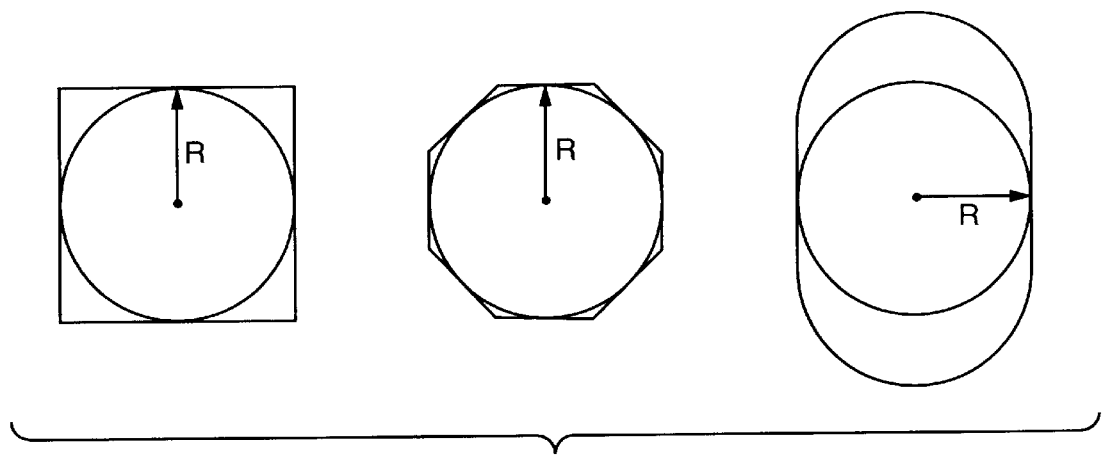
FIG. 8 shows the radius of curvature for three alternative profiles for the inside surface of the sleeve of the invention.
Figure 3:
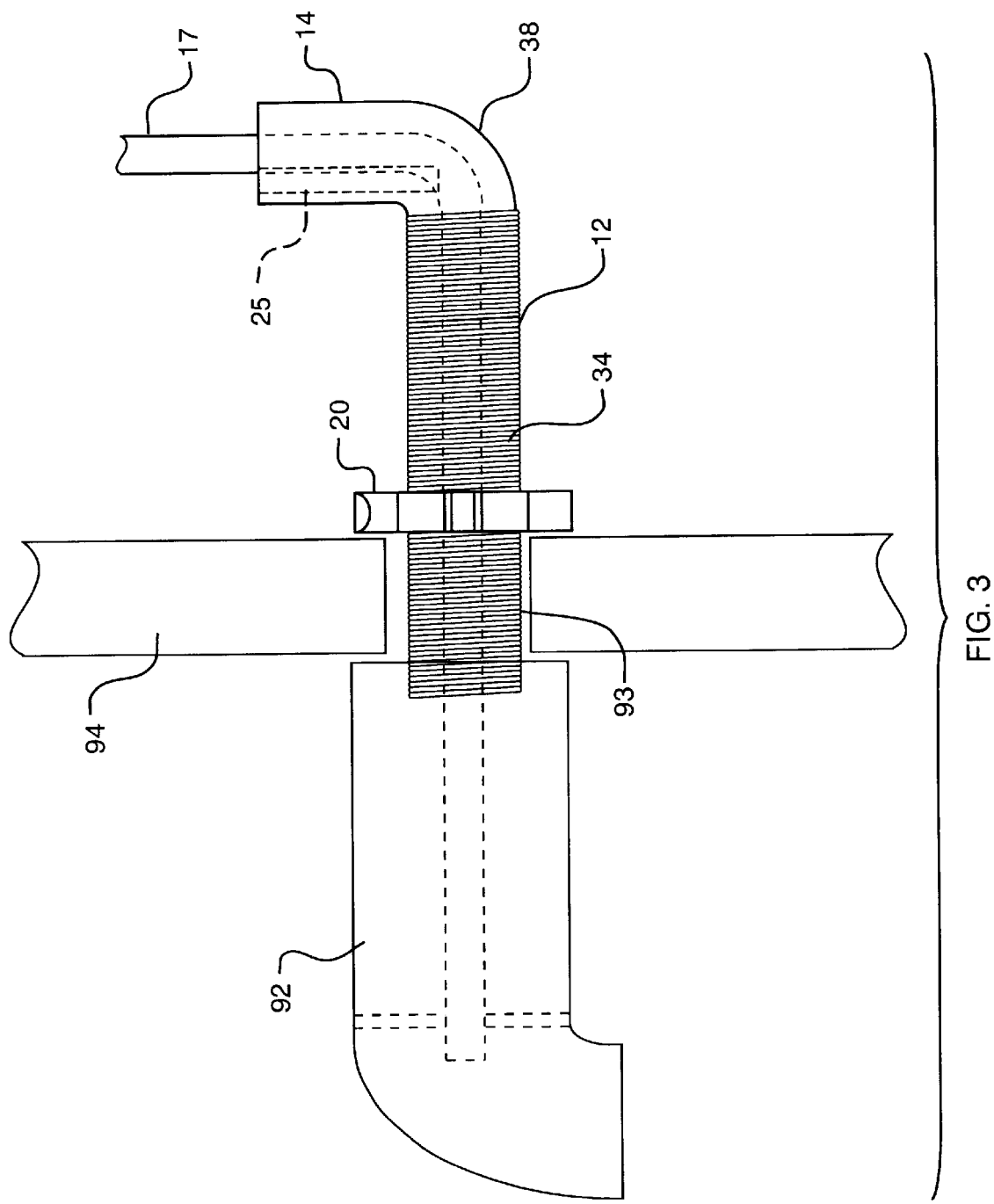
FIG. 3 is a side view of the preferred embodiment of the device of the invention installed in connection with a pipe and spout.

FIG. 8 shows the radius of curvature for three alternative profiles for the inside surface of the sleeve of the invention.

Figure 9:
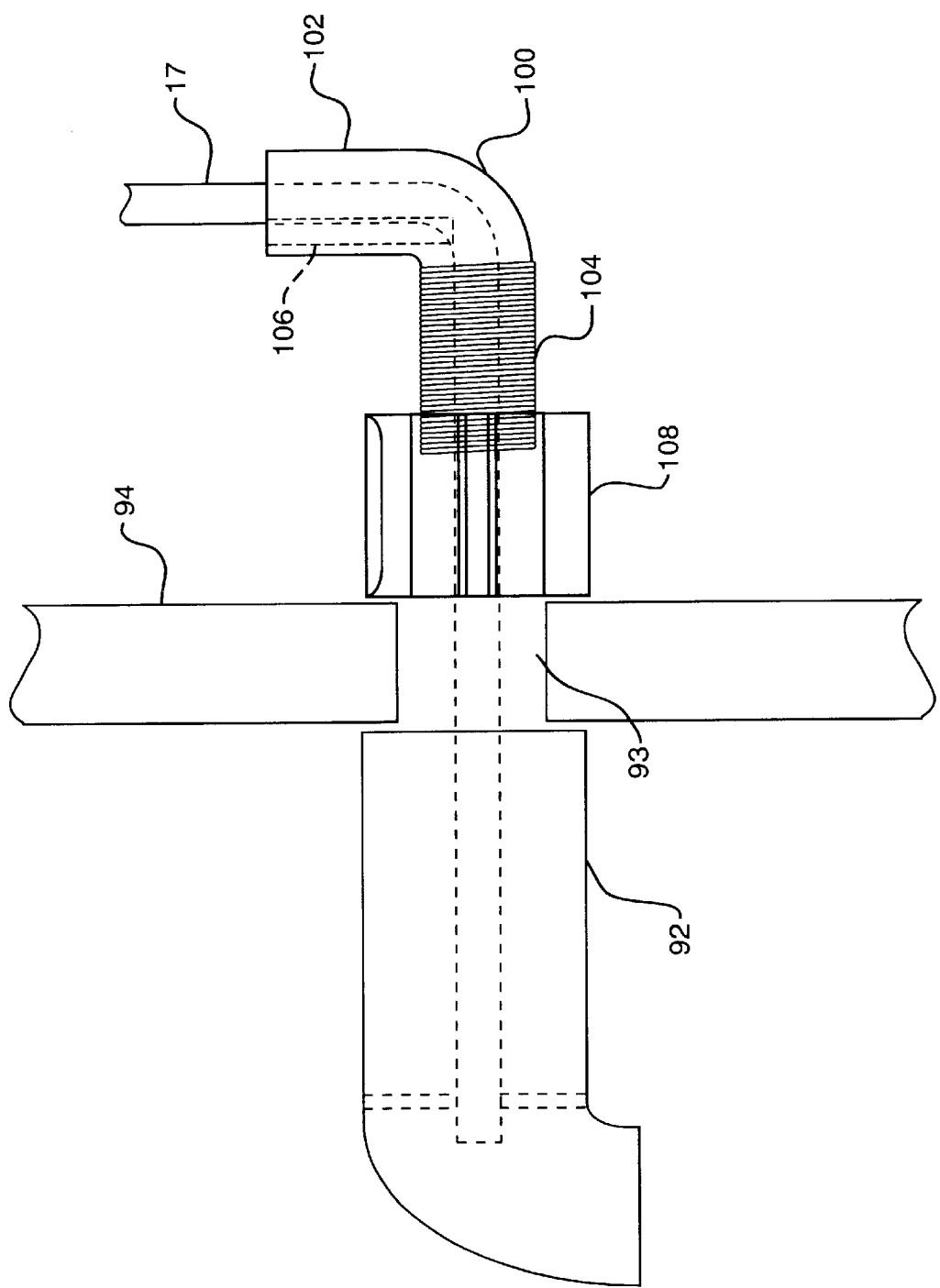
FIG. 9 is another preferred embodiment of the device of the invention installed in connection with a pipe and spout.

A means for fixing sleeve 12 in a position relative to the stop member or wall is also provided. The means for fixing preferably comprises ring nut 20 (FIGS. 1 and 4) which is provided with finger stops 22. Ring nut 20 also has an inside annular surface provided with one or more threads 36 (FIG. 1) which correspond to threads 34 on sleeve 12. The means for fixing may alternatively comprise a series of detents. For example, as shown in FIG. 9, a series of grooves may be provided along the outside surface of the first leg 104 of sleeve 100 which correspond to ridges provided on the inside surface of the nut 108, so that, as the nut is pushed toward the stop member, the ridges catch in the grooves to prevent the nut from moving backward along the sleeve. Similar to device 10, sleeve 100 has a closure member 106 that slides into second leg 102. In this instance, the nut may be longer and the first leg shorter, than in device 10.

Figure 4:
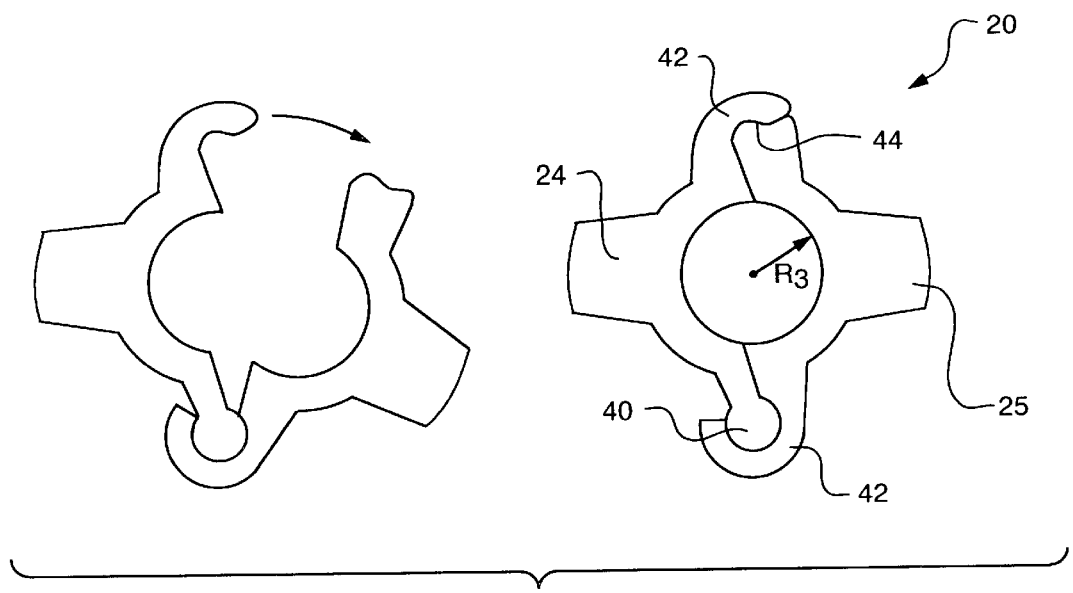
FIG. 4 is a side view of the preferred embodiment of the means for fixing 20 shown in FIG. 1.
Figure 5:
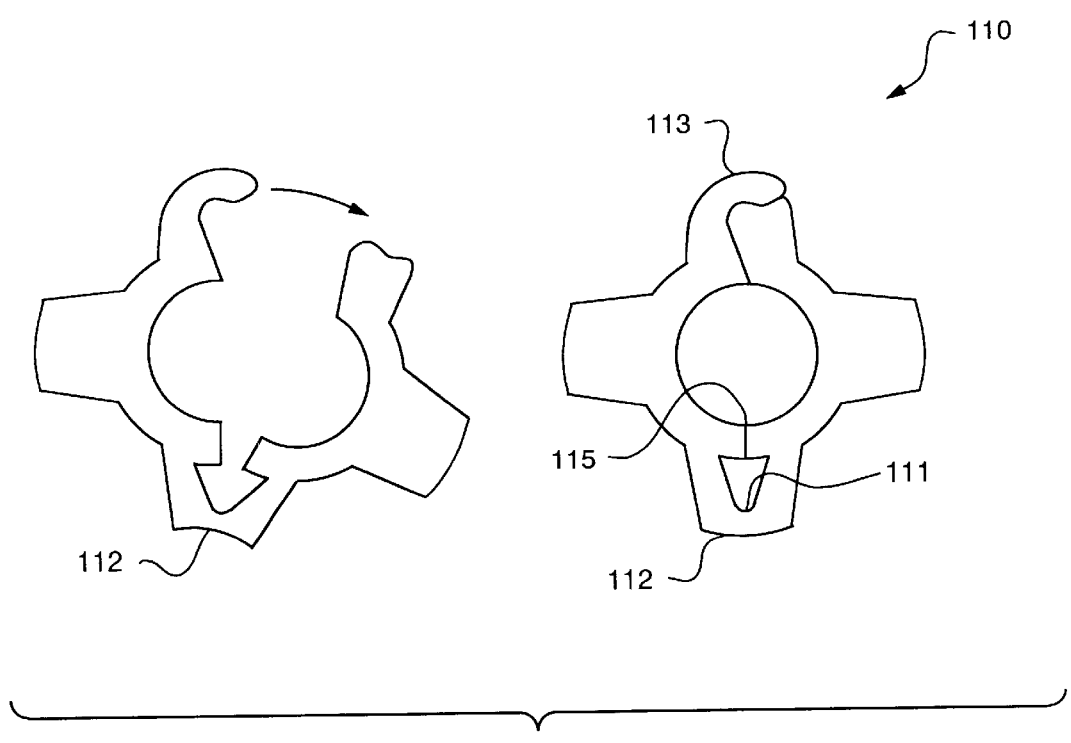
FIG. 5 is another preferred embodiment of the means for fixing.
Figure 6:
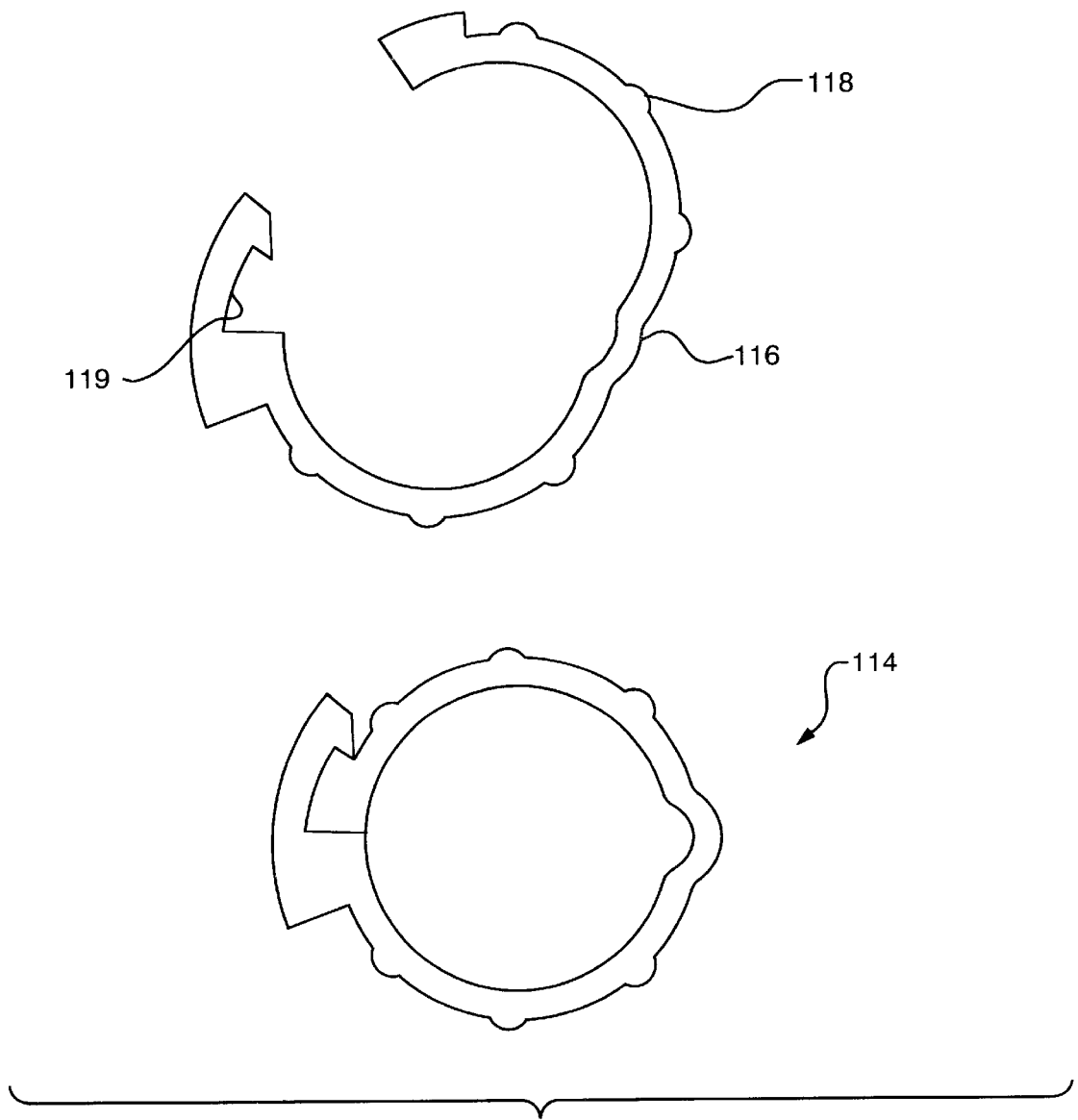
FIG. 6 yet another preferred embodiment of the means for fixing.
Figure 7:
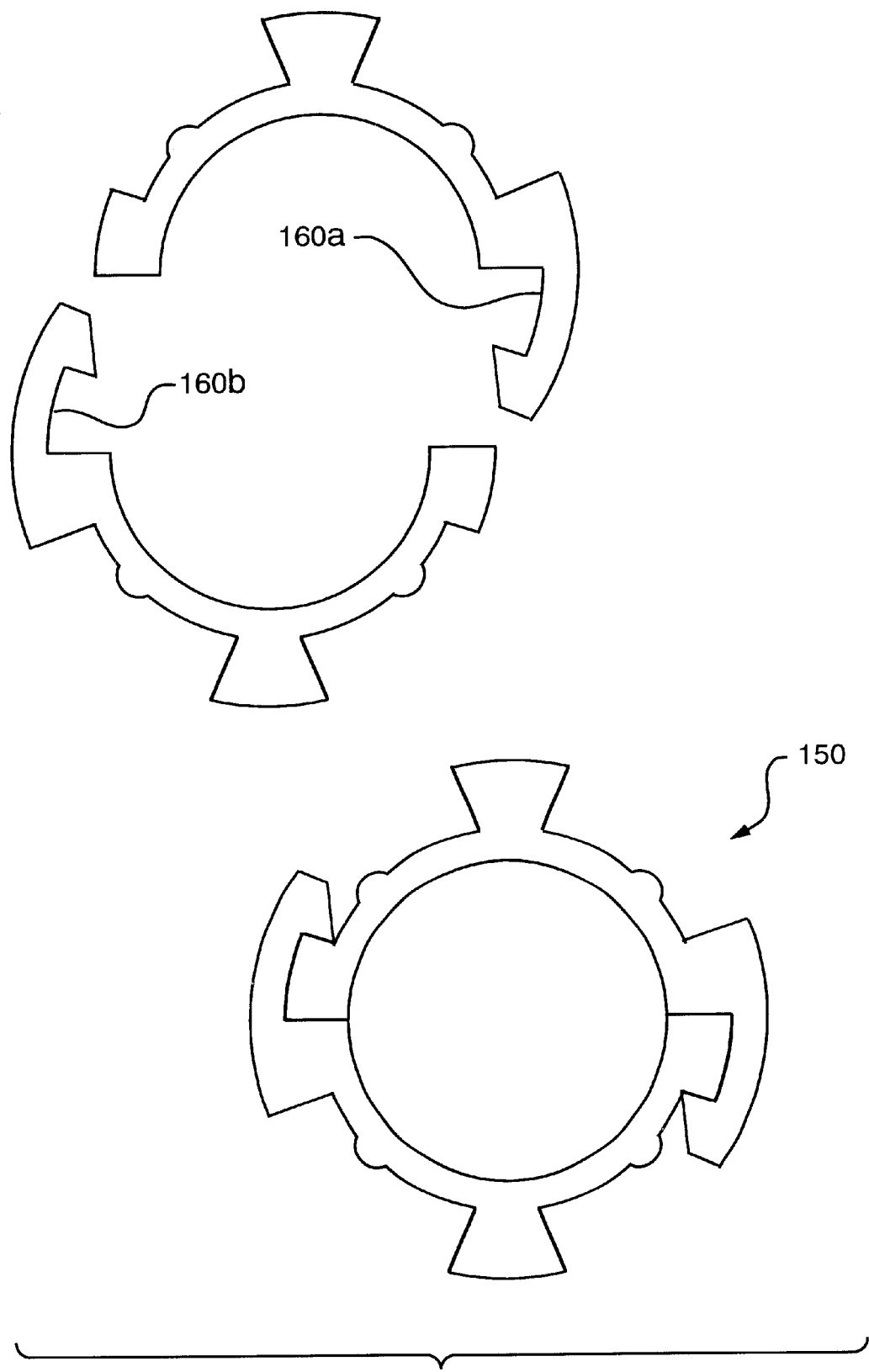
FIG. 7 is yet another preferred embodiment of the means for fixing.

The means for fixing preferably comprises a means for at least partially opening the nut to allow the nut to be positioned about the leg 16 and for fixing the nut in a closed position after the nut is positioned about leg 16. For example, nut 20 (FIGS. 1 and 4) comprises a ball and socket joint on one side made up of ball 40 and socket 42. Nut 20 further comprises a detent closure. As shown in FIG. 4, the detent in nut 20 is achieved by a groove or depression 44 and a corresponding catch 42. Nut 20 is opened and closed by lifting up on catch 42 and swinging the left half 24 away from the right half 25. Ball 40 thus rotates to and fro within socket 42 allowing nut 20 to be opened and closed around sleeve 12. Nut 20 must have an inside radius of curvature $R_3$ large enough to close about sleeve 20 so that nut 20, when closed about sleeve 20 can be rotated along the threads of sleeve 20 to loosen or tighten the nut as needed to tighten the spout against a wall or other intervening stop member. Alternative designs for the means for at least partially opening and closing the nut of the invention are shown in FIGS. 5–7. Nut 110 (FIG. 5) comprises hinge 112 and detent 113. Hinge 112 is formed by a thin, flexible outer wall 111 and an inner split wall 115. Nut 114 (FIG. 6) comprises hinge 116, a tongue and groove catch 119 and a plurality of surface asperities 118. Nut 150 (FIG. 7) comprises two opposing tongue and groove catches 160a and 160b.

The term "stop member", as used in this specification, may comprise any thing which is positioned between the unfinished side of the wall, tub or sink, from which the incoming water pipe extends, and the nut. For example, a washer or other such item may be positioned between the nut and wall.

The term "angled pipe", as used in this specification, refers to any pipe which has a bend at some point along the pipe. The degree of bend is only limiting to the extent that the depth of the bend must be greater than any difference between the outer diameter of the pipe at the bend and the inner diameter of the sleeve at the bend so that the sleeve maintains its position along the pipe despite backward pressure caused by screwing the ring nut tightly up against an opposing wall or stop member.

Figure 10:
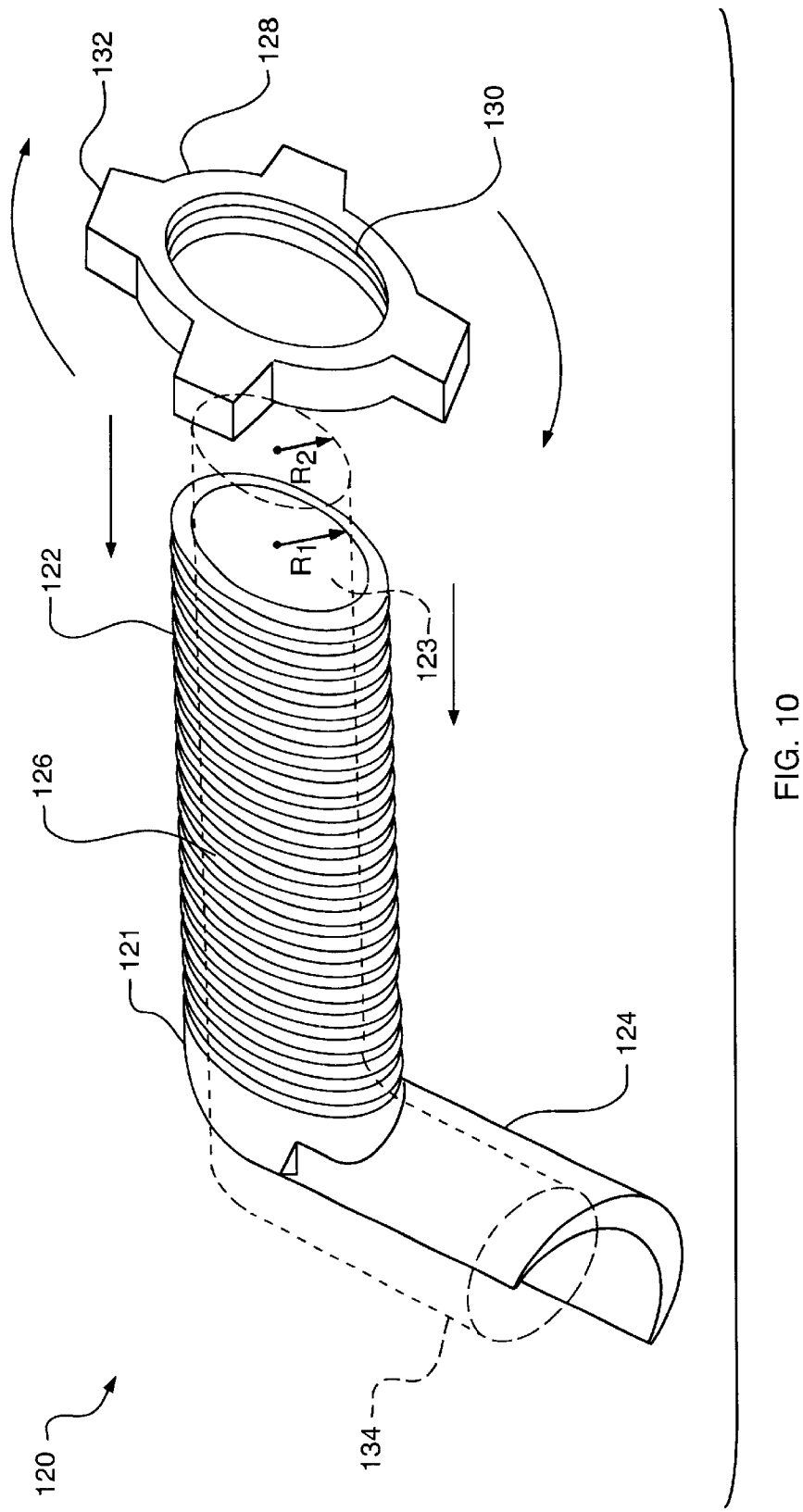
FIG. 10 is yet another preferred embodiment of the device of the invention.
Figure 11:
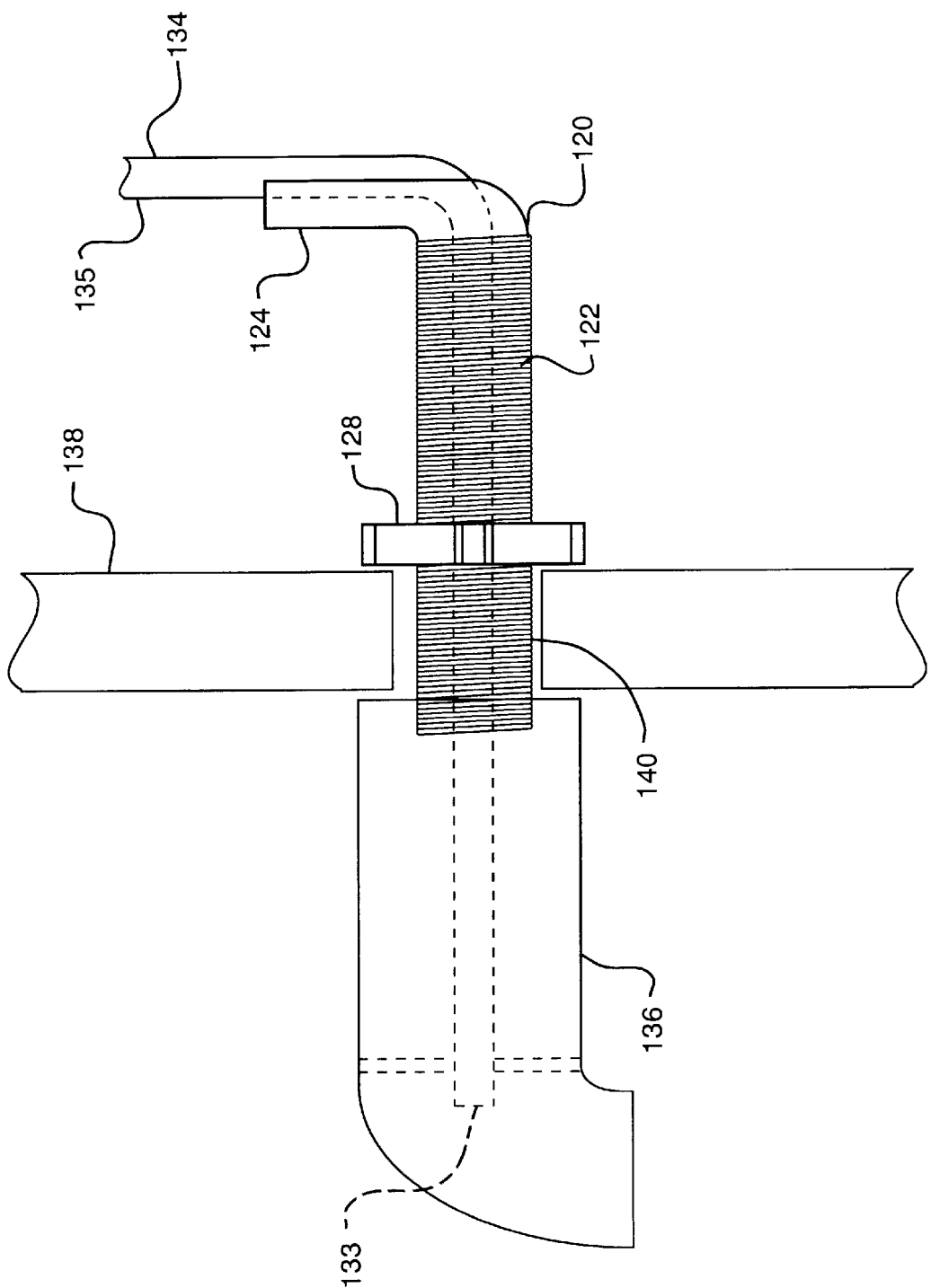
FIG. 11 is the preferred embodiment of FIG. 10 installed in connection with a pipe and spout.

Another preferred embodiment of the invention is shown and generally referred to in FIGS. 10 and 11 as device 120. Device 120 is adapted for original use, whereby device 10 is installed along with the underlying pipe and spout, as opposed to device 10 which is adapted for after-market use, although device 10 could also be installed along with the underlying pipe and spout. Device 120 comprises leg 122, leg 124 and nut 128. Leg 122 is provided with a series of threads 126 along its length. Nut 128 is provided with a plurality of finger stops 132 and threads 130 on its inside surface which correspond to threads 126 on leg 122. Leg 124 is a half-sleeve. Unlike device 10, device 120 does not have a slit along the length.

To install device 120, before underlying pipe 134 is attached to spout 136 (FIG. 11), nut 128 is screwed onto leg 122 and the spout end 133 of pipe 134 is inserted into the juncture end 121 of device 120 until the spout end 133 protrudes from the round end 123 of device 120. Device 120 is pushed back along pipe 134 until the inside surface of leg 124 rests against surface 135 of the opposite angled portion of pipe 134, as shown in FIGS. 10 and 11. Pipe 134 is then inserted through opening 140 in wall 138 and fixed to spout 136. Once pipe 134 is fixed in spout 136, nut 128 is tightened against the unfinished side of wall 138 until the back side of spout 136 is flush against the inside or finished side of wall 138.

The device and method of the invention is not necessarily limited to a tub spout. The device of the invention is designed to be adapted to a variety of circumstances in which an angled pipe must be fixed in position relative to a wall or anything else having an opening through which a portion of the pipe extends.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A device for tightening a spout attached to a previously installed angled pipe, having an outside radius of curvature, in a position relative to a stop member having an opening through which at least a length of said pipe extends, comprising, at least one sleeve, comprising,
at least a first leg and a second leg which meet at a juncture which defines an angle substantially corresponding to said angled pipe, wherein said first and second legs have a combined total length,
wherein said first leg has a leg length and is substantially rigid along at least a portion of said leg length, and has an inside radius of curvature that is approximately equal to or greater than said radius of curvature of said angled pipe, and
wherein said sleeve has a slit, along said combined total length of said first and second legs, to allow said sleeve to be pressed onto and at least partially about said angled pipe.

2. The device of claim 1, further comprising at least one slit closure member which is capable of closing at least a portion of said slit in said second leg, after said sleeve is pressed about said pipe, to fix said sleeve in a position relative to said pipe.

3. The device of claim 1, further comprising at least one means for fixing said sleeve in a position relative to said stop member.

4. The device of claim 3, wherein said first leg has one or more threads on an outside surface of at least a portion of said first leg, and wherein said means for fixing comprises, at least one nut, having an inside annular surface, comprising,
   a means for at least partially opening said nut to allow said nut to be positioned about said leg and for fixing said nut in a closed position after said nut is positioned about said leg, and
   one or more threads, on said inside annular surface, adapted to engage said leg threads.

5. The device of claim 4, further comprising at least one slit closure member which is capable of closing at least a portion said slit in said second leg, after said sleeve is pressed about said pipe, to fix said sleeve in a position relative to said pipe.

6. The device of claim 3, further comprising at least one slit closure member which is capable of closing at least a portion said slit in said second leg, after said sleeve is pressed about said pipe, to fix said sleeve in a position relative to said pipe.

7. The device of claim 6, wherein said slit in said second leg comprises two opposing edges having a groove in each of said edges, and wherein said slit closure member comprises a sleeve wall insert with two opposing edges each having a profile that corresponds to one of said grooves and is adapted to engage said one of said grooves.

8. The device of claim 3, wherein said means for fixing comprises, at least one nut comprising, an inside annular surface and a means for at least partially opening said nut to allow said nut to be positioned about said leg and for fixing said nut in a closed position after said nut is positioned about said leg.

9. A device for tightening a spout attached to an angled pipe, having an outside radius of curvature, in a position relative to a stop member having an opening through which at least a length of said pipe extends, comprising, at least one sleeve, comprising,
   at least a first leg and a second leg which meet at a juncture which defines an angle substantially corresponding to said angled pipe,
   wherein said first leg has a leg length and is substantially rigid along at least a portion of said leg length, has an inside radius of curvature that is approximately equal to or greater than said radius of curvature of said angled pipe.

10. The device of claim 9, further comprising at least one means for fixing said sleeve in a position relative to said stop member.

11. The device of claim 9, wherein said first leg has one or more threads on an outside surface of at least a portion of said first leg, and wherein said means for fixing comprises, at least one nut, having an inside annular surface and one or more threads, on said inside annular surface, adapted to engage said leg threads.

12. A method for tightening a spout attached to a previously installed angled pipe, having an outside radius of curvature, in a position relative to a stop member having an opening through which at least a length of said pipe extends and two opposing sides, comprising the steps of,
   providing a device comprising at least one sleeve, comprising,
      at least a first leg and a second leg which meet at a juncture which defines an angle substantially corresponding to said angled pipe, wherein said first and second legs have a combined total length,
      wherein said first leg has a leg length and is substantially rigid along at least a portion of said leg length, has an inside radius of curvature that is approximately equal to or greater than said radius of curvature of said angled pipe, and
      wherein said sleeve has a slit, along said combined total length of said first and second legs;
   placing said sleeve onto and at least partially about said angled pipe via said slit, so that said spout is positioned tightly against one side of said stop member and said sleeve is positioned tightly against the opposing side of said stop member.

13. The method of claim 12, wherein said device further comprises a means for fixing said sleeve in a position relative to said stop member, and wherein said first leg has one or more means, for engaging said fixing means at one or more positions relative to said stop member, on an outside surface of at least a portion of said first leg, and further comprising the step of, causing said fixing means to move in a direction so that said nut moves towards said stop member until said fixing means is positioned tightly against one side of said stop member and said spout is positioned tightly against the opposing side of said stop member.

14. The method of claim 12, wherein said first leg has one or more threads on an outside surface of at least a portion of said first leg, and further comprising the steps of,
   providing at least one nut, having an inside annular surface, comprising,
      a means for at least partially opening said nut to allow said nut to be positioned about said leg and for fixing said nut in a closed position after said nut is positioned about said leg, and
      one or more threads, on said inside annular surface, adapted to engage said leg threads;
   fixing said nut in a closed position about said leg; and
   turning said nut in a direction so that said nut moves towards said stop member until said nut is positioned tightly against one side of said stop member and said spout is positioned tightly against the opposing side of said stop member.

15. As The method of claim 12, wherein said device further comprises at least one slit closure member and further comprising the step of, applying said slit closure member to said second leg, after said sleeve is pressed about said pipe, to fix said sleeve in a position relative to said pipe.

16. The method of claim 15, wherein said slit in said second leg comprises two opposing edges having a groove in each of said edges, and wherein said slit closure member comprises a sleeve wall insert with two opposing edges each having a profile that corresponds to one of said grooves and is adapted to engage said one of said grooves; and wherein said step of applying comprises inserting said sleeve wall insert into said second leg so that said edges of said sleeve wall insert engage said grooves of said second leg.

17. A device for tightening a spout attached to an angled pipe, having an outside radius of curvature, in a position relative to a stop member having an opening through which at least a length of said pipe extends, comprising, at least one sleeve, comprising,
- at least a first leg and a second leg which meet at a juncture which defines an angle substantially corresponding to said angled pipe, wherein said first and second legs have a combined total length,
- wherein said first leg has a leg length and is substantially rigid along at least a portion of said leg length, and has an inside radius of curvature that is approximately equal to or greater than said radius of curvature of said angled pipe; and
- wherein said second leg is a half-sleeve.

18. The device of claim 17, further comprising at least one means for fixing said sleeve in a position relative to said stop member.

19. The device of claim 17, wherein said first leg has one or more threads on an outside surface of at least a portion of said first leg, and wherein said means for fixing comprises, at least one nut, having an inside annular surface and one or more threads, on said inside annular surface, adapted to engage said leg threads.

* * * * *